Patented Nov. 27, 1945

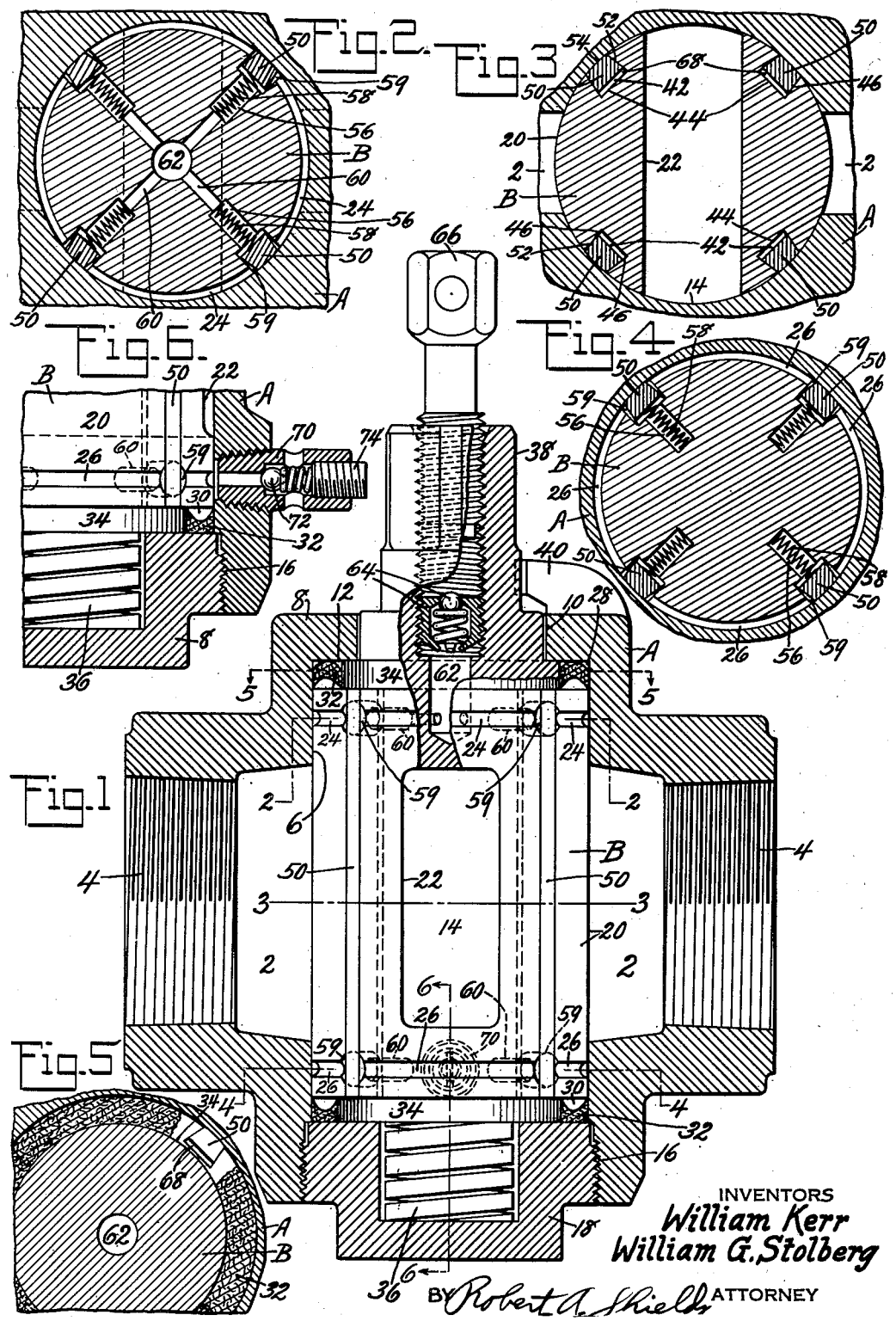

2,389,670

UNITED STATES PATENT OFFICE 2,389,670

LUBRICATED WEDGE SEAL VALVE

William Kerr, Roseville, and William G. Stolberg, Detroit, Mich., assignors to American Car and Foundry Company, New York, N. Y., a corporation of New Jersey Application October 21, 1943, Serial No. 507,128

11 Claims. (Cl. 251—93)

This invention relates to valves in general and in particular to lubricated valves having wedge elements acting in conjunction with the lubricant to seal the valve against leakage.

Numerous types of lubricated valves have been built in the past but practically all of these valves have had a lubricant passage exposed to the wash of line fluid during opening and closing of the valve. The plug of the lubricated valves as now constructed have the exposed lubricant groove cut off from the source of lubricant pressure when the valve is moved between open and closed positions thus limiting wash out to the exposed groove alone. It is an object, therefore, of the present invention to provide a valve in which the lubricant grooves are at least partially protected by metallic elements preventing washout during movement of the valve.

A still further object of the invention is the provision of a valve which may, if desired, be completely lubricated at all times and without excessive escape of lubricant into the line.

A still further object of the invention is the provision of a valve having wedge members resiliently urged into contact with the adjacent valve surface in order to provide seals against leakage of fluid even though the plug should be forced to one side of the body bore by excessive line pressure.

Yet another object of the invention is the provision of a valve sealed against leakage by wedge members carried by one valve part and urged against the other valve part by both resilient and lubricant pressures.

These and other objects of the invention will be apparent to persons skilled in the art from a study of the following description and accompanying drawing, in which Figure 1 is a sectional view through the improved valve showing the parts in valve closed position;

Fig. 2 is a sectional view taken substantially on line 2—2 of Fig. 1;

Fig. 3 is a sectional view taken substantially on line 3—3 of Fig. 1;

Fig. 4 is a sectional view taken substantially on line 4—4 of Fig. 1;

Fig. 5 is a sectional view taken substantially on line 5—5 of Fig. 1, and

Fig. 6 is a partial sectional view taken substantially on line 6—6 of Fig. 1.

Referring now to the drawing in detail, it will be seen that the valve consists of two main parts, namely, the body A and the core or plug B. The body, as clearly shown, is made in one piece having a passageway 2 extending therethrough and internally threaded as at 4 adjacent its ends in order that the valve may be connected into suitable piping. It is, of course, obvious that the valve body may equally well be fitted with flanges or otherwise prepared for connection into the piping. Extending substantially at right angles to the passageway is a transverse bore 6 normally open at one end and partially closed at the head end 8 of the body. The head end is provided with an opening 10 of a smaller diameter than the bore 6, thus providing a head shoulder portion having an inner seating surface 12. The transverse bore is accurately machined to provide a smooth body seating surface 14 interrupted at its lower end by a threaded portion 16 adapted to receive a closure cap 18 which when screwed into position effectively closes the one end of the transverse bore.

The valve plug B is of generally cylindrical form and has the outer surface finished to provide a plug seating surface 20 interrupted by a passageway 22 extending through the plug and adapted to register with the passageway 2 of the body when the valve is in open position. The plug seating surface is also interrupted by an upper circumferential groove 24 and a lower circumferential groove 26 spaced slightly from the ends of the plug. The seating surface is also interrupted by having the upper and lower corners cut back to provide annular spaces 28 and 30 respectively, which spaces are adapted to receive flexible or expanding sealing rings 32. These rings are shaped so as to have the central portion backed up by portions of the body as is also one side edge, the other side edge being adapted to extend against the shouldered portions 34 of the plug which are formed by cutting back the seating surface of the plug. The lower end of the plug, as clearly shown, is adapted to be supported on a spring 36, while the upper end is provided with a stem 38 extending outwardly through the head of the body and equipped to receive any suitable operating means by means of which the valve plug may be turned in the body. The body is shown as equipped with a stop 40 adapted to cooperate with the valve plug and limit rotation thereof to a ninety degree movement. This stop, however, is not necessary since the valve plug could be rotated a full three hundred and sixty degrees. However, the stop is of assistance in indicating whether the valve is in full open or full closed position.

The plug seating surface 20 is additionally interrupted by axially extending grooves 42, having their base portions 44 slightly wider than their outer portions which interrupt the seating surfaces. In other words, the grooves 42 have their sides 46 converging outwardly, all as clearly shown in the various figures. The grooves are located in any desired position with respect to the passageway 22 but as shown are placed ninety degrees apart and approximately forty-five degrees from the center of the passageway. The grooves extend from end to end of the plug and are adapted to receive wedges 50 having tapered sides 52 and an outer machined seating surface 54 adapted to seat against the body seating surface of the transverse bore. Adjacent the upper and lower ends of the grooves radially extending holes 56 are drilled or otherwise formed in the plug to form receptacles for the reception of springs or other resilient means 58 seated at one end against the base of the wedges and at the other end against the inner end of the hole or receptacle. These holes or receptacles are enlarged adjacent their outer ends to provide clearance spaces 59 between the walls thereof and the wedges. The holes adjacent the upper ends of the plug are connected by small passageways 60 with the lower end of an axially extending hole 62 formed in the stem of the plug. This hole is tapped to receive a check valve assembly 64 and a screw or ram 66 by means of which lubricant may be forced through hole 62 and passages 60 into the upper holes or receptacles. From the upper or head end receptacles lubricant under pressure may flow along the spaces 68 formed between the base of the wedges 50 and the inner surface of the grooves 42. This lubricant pressure will, of course, assist the springs 58 in forcing the wedges outwardly against the seating surface 14 of the body. In order that a slight amount of lubricant may escape past the wedges and also in order that the wedges may at all times freely engage the body seating surface, the wedges are so constructed that when the valve is in the assembled position the tapered sides of the wedges are spaced slightly from the tapered sides of the grooves 42. Full charging of the circumferential grooves 24 and 26 is insured by the fact that the enlarged ends of the holes or receptacles 56 are located at the juncture of the various grooves and will, therefore, permit lubricant to flow to the circumferential grooves from spaces 68 through spaces 59. It is possible for an operator to develop extremely high lubricant pressures in the lubricating system and such pressures may burst the body, accordingly, the body is drilled and tapped to receive a safety valve assembly 70, having a ball check 72 resiliently held onto its seat by an adjusting screw 74. This safety valve assembly is in direct communication with one of the circumferential grooves, preferably the lower since when placed in this position it may serve as a means for cleaning the valve by forcing lubricant through the system and out of the safety valve opening.

It is obvious from the preceding description that the wedges 50 are free to move inward and outward a slight amount in the grooves 42 when the plug is in its assembled position. Due to the comparatively slight taper of the wedges and grooves the wedges may move a considerable amount to compensate for wear without excessively reducing the size of the passageway between the tapered sides of the wedges and grooves. Since the passageways between the wedges and their receiving grooves are extremely small, there is very slight chance of lubricant washout by line fluid when the valve is moved between open and closed positions. Any tendency for high pressure flowing past the valve through the lubricant passageways is also effectively blocked by means of the wedges, for even if the exposed wedge tended to move inward under line pressure, its base would immediately close and seal the end of passages 60 and prevent any blow-by. In all valves used in high pressures there is a slight movement of the plug toward the down stream side when the valve is in closed position. Under such conditions there is a possibility of leakage occurring. However, with the valve as described the wedges will move outwardly and will constantly be held in tight engagement with the body seating surface, thus there is always at least four points of contact between the plug and body seating surfaces to prevent leakage and these points or areas of contact are backed up by lubricant behind the wedges and by lubricant which has been smeared over the seating surfaces by escape between the tapered sides of the wedges and their receiving grooves.

Although the grooves and wedges have been shown as placed in the plug seating surface, it is obvious that they could as readily be placed in the body seating surface, although such placement might require a slight enlargement of the closure cap 18 in order that the wedges might be inserted into the grooves. In any case, whether the wedges are placed in the body or plug they would be mounted for radial sliding movement and urged against the cooperating seating surface by both resilient and lubricant pressures. Also the wedges, since they move substantially normal to the seating surfaces, may be used with tapered plugs as well as with the cylindrical type of plug shown. It will be obvious from the preceding description and a study of the drawing that various modifications and rearrangements of parts other than those shown and described may be made and all such modifications and rearrangements of parts are contemplated as will fall within the scope of the appended claims defining our invention.

What is claimed is:

1. In a lubricated valve, a body member having a passageway therethrough, a plug member rotatably mounted in the body member and having a passageway therethrough adapted to register with the body passageway when the valve is in open position, seating surfaces formed on said plug member and in said body member, grooves interrupting the seating surface of one of said members and located in planes which also include the axis of said plug member, wedges located in said grooves and of a thickness less than the depth of the grooves to thereby provide spaces between the wedges and the base of the grooves, said wedges and grooves being so constructed and arranged as to lock said wedges in said grooves by relative axial movement, and means to force lubricant under pressure into said spaces to thereby force the wedges into sealing engagement with the seating surfaces of the adjacent member.

2. In a lubricated valve, a body member having a passageway therethrough, a plug member rotatably mounted in the body member and having a passageway therethrough adapted to register with the body passageway when the valve is in open position, seating surfaces formed on said plug member and in said body member, grooves interrupting the seating surface of one of said members and located in planes which also include the axis of said plug member, wedges located in said grooves and of a thickness less than the depth of the grooves to thereby provide spaces between the wedges and the base of the grooves, and means to force lubricant under pressure into said spaces to thereby force the wedges into sealing engagement with the seating surface of the adjacent member, said wedges being tapered and of slightly less width than said grooves whereby lubricant under pressure may escape from said spaces and contact the seating surfaces to assist the wedges in sealing the valve against leakage.

3. In a lubricated valve, a body member having a passageway therethrough, a plug member rotatably mounted in the body member and having a passageway therethrough adapted to register with the body passageway when the valve is in open position, seating surfaces formed on said plug member and in said body member, taper sided grooves interrupting the seating surface of one of said members, taper sided wedges retained in said taper sided grooves, means to supply lubricant under pressure to said taper sided grooves behind said taper sided wedges to thereby force the latter into sealing engagement with the seating surface of the adjacent member.

4. In a lubricated valve, a body member having a passageway therethrough, a plug member rotatably mounted in the body member and having a passageway therethrough adapted to register with the body passageway when the valve is in open position, seating surfaces formed on said plug member and in said body member, taper sided grooves interrupting the seating surface of one of said members, taper sided wedges retained in said taper sided grooves, means to supply lubricant under pressure to said taper sided grooves behind said taper sided wedges to thereby force the latter into sealing engagement with the seating surface of the adjacent member, the tapered sides of said grooves and wedges being normally spaced apart slightly whereby lubricant under pressure may be forced onto the seating surfaces to assist the wedges in sealing the valve against leakage.

5. In a lubricated valve, a body member having a passageway therethrough, a plug member rotatably mounted in the body member and having a passageway therethrough adapted to register with the body passageway when the valve is in open position, seating surfaces formed on said plug member and in said body member, taper sided grooves interrupting the seating surface of one of said members, taper sided wedges retained in said taper sided grooves, resilient means constantly urging said taper sided wedges outwardly in said taper sided grooves, and means to supply lubricant under pressure to said taper sided grooves behind said taper sided wedges to thereby assist said resilient means to force the taper sided wedges into sealing engagement with the seating surface of the adjacent member.

6. In a lubricated valve, a body member having a passageway therethrough, a plug member rotatably mounted in the body member and having a passageway therethrough adapted to register with the body passageway when the valve is in open position, seating surfaces formed on said plug member and in said body member, grooves interrupting the seating surface of one of said members and located in planes which also include the axis of said plug member, wedges locked in said grooves by an axial movement thereof and of a thickness less than the depth of the grooves to thereby provide spaces between the wedges and the base of the grooves, and means to force lubricant under pressure into said spaces to thereby force the wedges into sealing engagement with the seating surface of the adjacent member, and additional means constantly maintaining the sealing engagement between the wedges and seating surface of the adjacent member independently of the lubricant under pressure.

7. In a lubricated valve, a body member having a passageway therethrough, a plug member rotatably mounted in the body member and having a passageway therethrough adapted to register with the body passageway when the valve is in open position, seating surfaces formed on said plug member and in said body member, grooves interrupting the seating surface of one of said members, circumferential grooves interrupting the seating surface of one of said members adjacent the ends of the plug and intersecting said first named grooves, wedges located in said first named grooves and crossing said circumferential grooves, means to supply lubricant under pressure to said first named grooves and behind said wedges to force the latter into sealing engagement with the seating surface of the adjacent member, and additional means permitting the flow of lubricant past said wedges and into said circumferential grooves.

8. In a lubricated valve, a body member having a passageway therethrough, a plug member rotatably mounted in the body member and having a passageway therethrough adapted to register with the body passageway when the valve is in open position, seating surfaces formed on said plug member and in said body member, grooves interrupting the seating surface of one of said members, circumferential grooves interrupting the seating surface of one of said members adjacent the ends of the plug and intersecting said first named grooves, wedges located in said first named grooves and crossing said circumferential grooves, a source of lubricant under pressure, radially directed passages connecting said source with the points of intersection of said first named grooves and one of said circumferential grooves, said radially directed passages being enlarged adjacent their outer ends whereby lubricant under pressure may flow past said wedges and into said circumferential grooves.

9. In a lubricated valve, a body member having a passageway therethrough, a plug member rotatably mounted in the body member and having a passageway therethrough adapted to register with the body passageway when the valve is in open position, shouldered portions formed on said plug adjacent the ends thereof to provide annular spaces, axially extending grooves formed in said plug and connecting said annular spaces, wedges positioned in said grooves, flexible sealing means positioned in said annular spaces, and means for supplying lubricant under pressure to said grooves behind said wedges whereby said wedges and flexible sealing means are forced into sealing contact with said body.

10. In a lubricated valve, a body member having a passageway therethrough, a plug member rotatably mounted in the body member and having a passageway therethrough adapted to register with the body passageway when the valve is in open position, seating surfaces formed on said plug member and in said body member, grooves interrupting the seating surface of one of said members, circumferential grooves interrupting the seating surface of one of said members adjacent the ends of the plug and intersecting said first named grooves, wedges located in said first named grooves and crossing said circumferential grooves, a source of lubricant under pressure, radially directed passages connecting said source with the points of intersection of said first named grooves and one of said circumferential grooves, said radially directed passages being enlarged adjacent their outer ends whereby lubricant under pressure may flow past said wedges and into said circumferential grooves, and safety means having connection with the circumferential groove remote from said source of lubricant under pressure to thereby prevent excessive lubricant pressures in the valve.

11. In a lubricated valve, a body member having a passageway therethrough, a plug member rotatably mounted in the body member and having a passageway therethrough adapted to register with the body passageway when the valve is in open position, seating surfaces formed on said plug member and in said body member, grooves interrupting the seating surface of one of said members, circumferential grooves interrupting the seating surface of one of said members adjacent the ends of the plug and intersecting said first named grooves, wedges located in said first named grooves and crossing said circumferential grooves, a source of lubricant under pressure, radially directed passages connecting said source with the points of intersection of said first named grooves and one of said circumferential grooves, said radially directed passages being enlarged adjacent their outer ends whereby lubricant under pressure may flow past said wedges and into said circumferential grooves, and a passageway extending through said body member and having connection with the circumferential groove remote from said source of lubricant under pressure whereby old lubricant in said grooves may be forced out of the valve.

WILLIAM KERR.
WILLIAM G. STOLBERG.